Page & Hall,
2. Sheets, Sheet 1.
Forging Nuts.
No. 3031. Reissued Sept. 7. 1869.
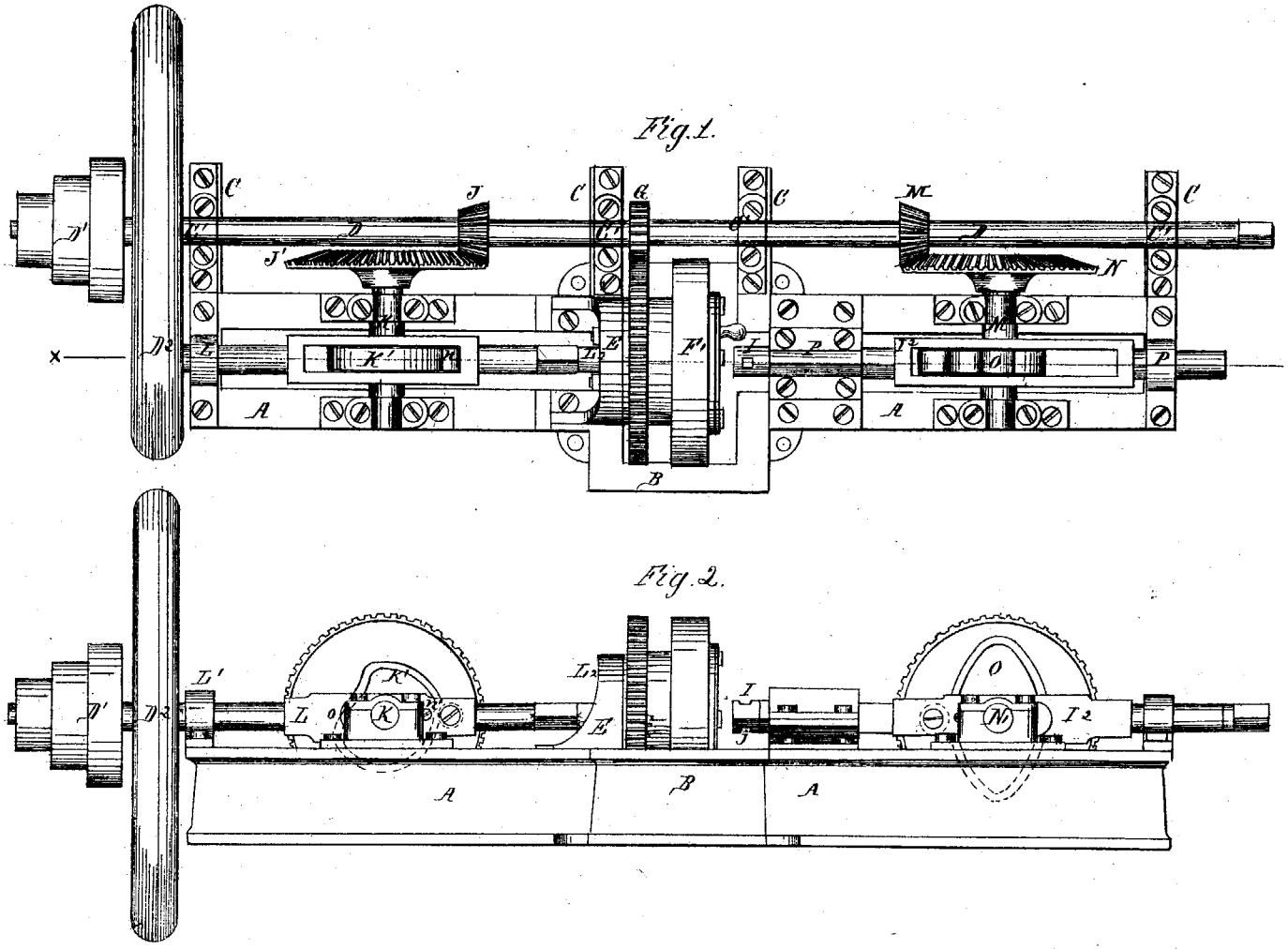
Witness: F. P. Stevens
James P. Scott
Geo. Dunham assignee
by J. Hoomes atty
N. PETERS, PHOTO-LITHOGRAPHER, WASHINGTON, D. C.

2. Sheets, Sheet 2.
Page & Hall,
Forging Nuts.
No. 3631. Reissued Sept. 7. 1869.
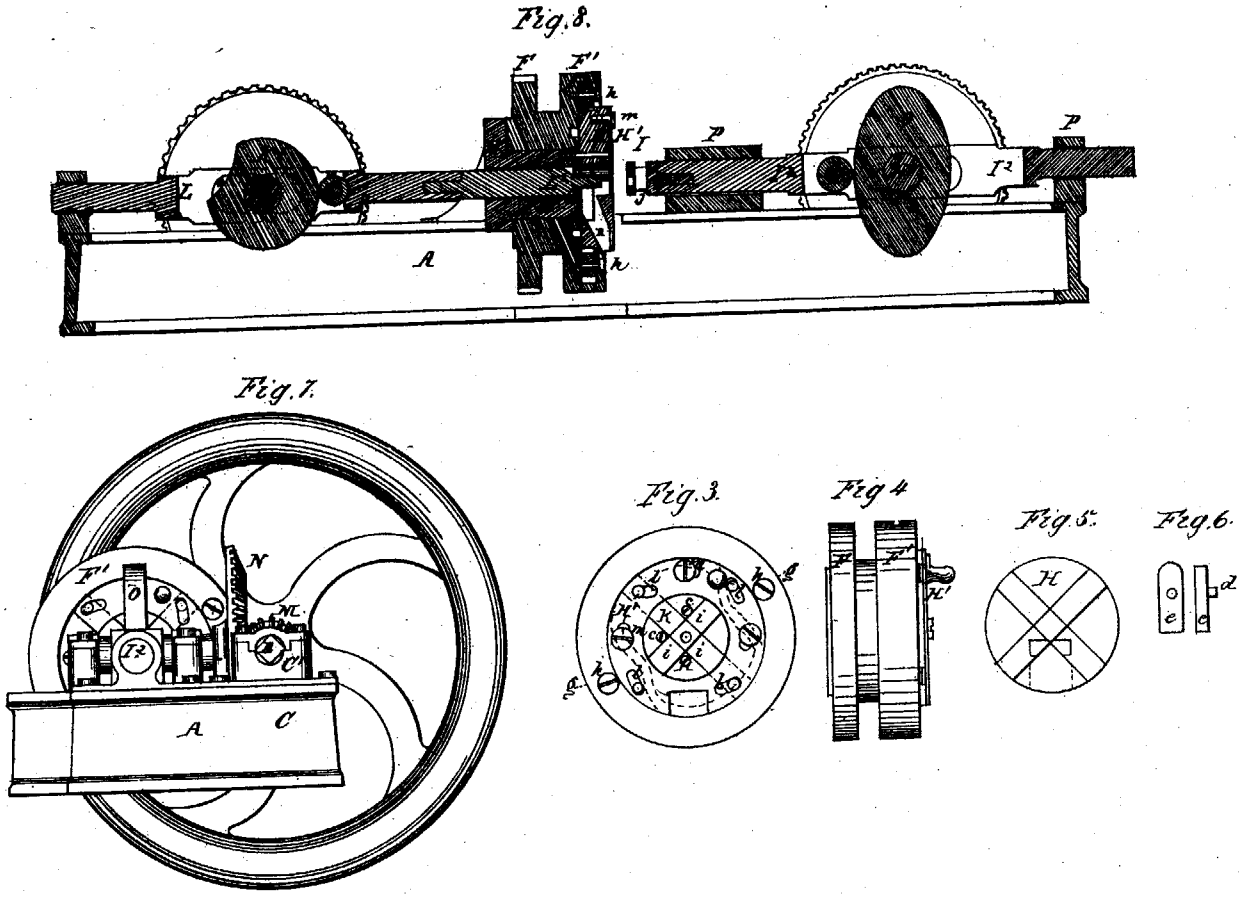
Witnesses J. R. Clowmbs
James P. Scott
Geo. Dunham
assignee
by J. Hoomber
atty
THE NORRIS PETERS CO., PHOTO-LITHO., WASHINGTON, D. C.

United States Patent Office.

GEORGE DUNHAM, OF UNIONVILLE, CONNECTICUT, ASSIGNEE, BY MESNE ASSIGNMENTS, OF EDWARD PAYE AND SAMUEL HALL.

*Letters Patent No.* 18,156, *dated September* 8, 1857,; *reissue No.* 3,631, *dated September* 7, 1869.

IMPROVED MACHINE FOR FORGING NUTS.

The Schedule referred to in these Letters Patent and making part of the same.

*To all whom it may concern:*

Be it known that EDWARD PAYE and SAMUEL HALL, both of the city, county, and State of New York, invented a new and useful Machine for Forging Nuts, by cutting, punching, and hammering, and that the same is described and represented in the following specification and drawings.

The object of the said invention is to produce from bar-iron nut-blanks, forged by machinery at their edges and faces, in manner similar to forging by hand. To this end the invention consists of certain combinations, arrangements, and constructions of certain instrumentalities, which are—

First, a cutter or shear-edge, adjustable in the machine, and constructed to operate in combination with a second cutter or shear-edge, so as to sever a piece or blank from the bar of iron presented to the machine.

Second, a punch to perforate said blank, which punch, as in the mode of forming nuts by hand, may be used as a mandrel, upon which the nut-blank is hammered.

Third, a die or snap-tool, against which the crowning face of the nut-blank is compressed.

Fourth, a flatter, to operate upon the flat side of the nut-blank, and, in connection with the die, to compress or forge the nut-blank flatwise.

Fifth, a transferring-instrument, to move the nut-blank from the place where it is cut to the place where the hammers act upon its edges.

Sixth, edging-hammers to forge the edges of the nut-blank; these hammers move in radial lines toward and from the axial line of the nut-blank when placed between them, and a sufficient number are used to forge all the edges of the nut-blank without the necessity of turning it, to place its edges in succession opposite edging-hammers.

In cutting a blank from a bar of iron, the tendency of the cutters is to cause a rounding of the face of the blank at that side of it which is moved foremost past the shear-edge; on the other hand, the tendency of the perforating-punch is to indent or depress the side of the blank at which it enters. According to the said invention, the above instrumentalities are so combined and arranged that the face of the blank which is moved foremost past the shear-edge is forced against the die or snap-tool, and becomes the crowning side of the completed blank, while the punch is caused to enter the blank at the same side, so that the nut-blank, when completed, is perfectly flat at its under side, by which is meant that side which is opposite to the crowning side. In the machine devised by said Paye and Hall, the nut-blank is punched before it is hammered edgewise, and the punch is left in the blank until the forging is completed, so that the punch operates as a stationary mandrel, to determine the form and size of the hole, although this is not essential to some of their combinations. The flatter also is constructed with a shear-edge at one of its sides, so as to operate as the moving cutter, and is arranged so as to act as the transferrer, to move the blank from the place where it is cut to the place where the hammers act upon its edges.

In order that the said invention may be fully understood, I will proceed to describe a nut-machine embodying all of its parts:

Figure 1 of the accompanying drawings being a plan of said machine;

Figure 2 being a side view of it;

Figure 7 being an end view of it;

Figures 3, 4, 5, and 6, being views of detached parts of the machine, designated by the same letters as the same parts in the other figures; and Figure 8 being a vertical longitudinal section of parts of the machine at the line *x x* of fig. 1.

In the accompanying drawings—

A A is a rectangular frame of cast-metal, with an enlargement in the middle, as shown at B, and four projections, C C, for the boxes $C^1$ $C^1$, which support the shaft D, which is fitted to turn in them, and is provided with a series of belt-pulleys, $D^1$, to which a belt may be applied to operate the machine.

The shaft D also is provided with a fly-wheel, $D^2$, to equalize the motion of the machine. The stand E may be made in the form shown, and is bolted to the frame A, so that it is held firmly in its place. This stand is provided with a cylindrical stud, *a a*, in fig. 8; this stud is perforated, to permit the perforating-punch to work through it, and to its face is secured the die or snap-tool $a^1$ which surrounds the punch $L^2$, and against which the crowning face of the nut-blank is compressed.

Upon this stud the gear F is fitted to turn freely and to carry with it the cam-collar F′ fastened to the gear F; the said gear being turned by the pinion G, fastened to the shaft D, as shown in the drawings.

The cam-collar F′ may be made in the form represented, and provided with a groove made in the form shown by the dotted lines *b b*, fig. 3.

There is a circular cavity in the collar F′ to which the disk H is fitted. This disk H is fastened by the screws *c c* to the face of the stud *a a*, and is constructed with two grooves on each of its sides, crossing each other at right angles; the grooves in the side next to the stud *a a* are occupied by four sliding hammers, *e e*, (one of which is shown in fig. 6) which are provided with studs, *d*, fitted to the cam-groove *b*, which cause the hammers *e e* to traverse in their grooves, the cam being so constructed as to force the two hammers which are opposite to each other toward each other at the same time, so that the nut is hammered on the two opposite edges at the same time, by each set of hammers, in alternate succession; and when the edging-hammers are carried against the nut by the groove *b*, the rollers *g g*, secured by the screws *h h* to the cam-collar, strike the rear ends of the said hammers, which are rounded, and force their faces against the nut with a blow like the blow of a hammer operated by hand, so as to condense the iron in the nut like hand-hammering.

The grooves in the front side of the disk H are occupied by the adjustable guides *i i i*, and by the adjustable shear or cutter *k*, all of which are fitted to slide in the grooves, and are provided with pins fitted to the cam-slots *l l* in the ring H′, which is fastened to the disk H by the screws *m m*, which pass through circular slots in the ring H′, as shown in the drawing, so that by loosening the screws, the ring may be turned and the cutter *k* and guides may be adjusted, and the screws may then be tightened so as to fasten the ring and hold the cutter and guides as required.

The pinion J is fastened to the shaft D, so as to turn the gear J′ just as fast as the gear F is turned by the pinion G, and the gear J′ is fastened to the shaft K, which turns in boxes fastened to the frame A, as shown in the drawing, and carries the cam K′, fastened to it, which is made in the form shown in figs. 2 and 8.

The slide L is made in the form shown in the drawing, one end being fitted to slide to and fro in the box $L^1$, fastened to the frame A, and the other end being provided with a socket for the shank of the perforating-punch $L^2$.

The body of this punch is fitted to traverse endwise in the stand E, and its end passes through a hole in the die *a′*, so as to perforate the nut-blank cut off by the operation of the cutting-flatter I and cutter *k*, and pushes against the face of the die *a′* by the continued movement of said flatter.

The slide L is provided with a long slot in one direction for the cam K′ to move in.

This cam acts against the roller *n* in the slot, and forces the punch $L^2$ forward, the punch and slide being drawn back by the action of the interior of the rim of the cam K′ upon the ends of the pins *n′ n′*, as shown in the drawing, the slide L being provided with slots *o o*, shown by dotted lines in fig. 2, to allow it to traverse while the shaft K revolves in the said slots.

The pinion M is fastened to the shaft D, and turns the gear N, on the shaft N′, just as fast as the other two pinions turn the other two gears.

This shaft N′ is fitted to turn in boxes fastened to the frame A, as shown in the drawing, and has the cam O fastened to it, which cam is made in the form represented in fig. 2, so as to operate the slide $I^2$ and flatter I twice, while the perforating-punch $L^2$ is operated once.

The slide $I^2$ is made in the form shown in the drawing, and fitted to traverse longitudinally in the boxes P P fastened to the frame A, as shown in the drawing; it is constructed in the same manner and provided with the same devices for operating it as have already been described as belonging to the slide L.

The shank of the flatter I is fitted to the socket in the end of the slide $I^2$.

This flatter I is constructed with square edges, one of which operates as the movable cutter or shear for cutting the blank from the bar.

The flatter thus constructed constitutes the movable cutter, and is perforated to receive the end of the punch $L^2$, and the piece punched out of the nut by it. It is also constructed with a transverse opening, *j*, into which the said piece is forced by the operation of the punch $L^2$, so that said piece may fall out of the machine.

There is a slot, R, made in the disk H, shown in fig. 8, through which the nut-blanks made fall out of the machine when they are finished.

The machine having been constructed and completed as above described, a bar of iron, a little narrower than the width of the flatter I, and of a proper thickness to form a nut-blank, is properly heated, and the machine is set in motion.

The end of the bar is placed between the guides *i i i*, and over the cutter *k*, whereupon the flatter I comes forward, and forcing said bar against the cutter *k*, cuts off a piece or blank to form a nut-blank, by the operation of the shear-edges of the flatter and cutter.

The continued forward movement of the flatter moves the blank past the cutter on to the punch $L^2$, and into the space between the edging-hammers.

The punch enters the blank at the face which has been moved foremost past the cutter and perforates the blank.

Then the nut-blank is compressed by the flatter I, which, continuing to move forward, forces the blank against the face of the die *a′ a′*, which determines the form of the crowning side of the blank.

After this compression flatwise, the flatter is drawn back, and the nut-blank is hammered edgewise by each pair of edging-hammers successively, then the flatter is forced forward again and compresses the nut a second time, after which it is hammered edgewise again by each pair of edging-hammers to complete it, then the punch $L^2$, which has remained in the nut while it was being hammered and compressed, is withdrawn by the cam K′, and the finished nut-blank drops through the hole R, made in the disk for that purpose, and falls out of the machine.

The heated bar may now be placed a second time between the guides *i i*, and another blank cut off and perforated and hammered to form another nut-blank, as above described.

The pieces punched out of the nut by the punch $L^2$, being forced into the flatter I, drop out through the opening *j*.

If a hexagonal nut-blank is to be made, six hammers may be used, and the cam should be so constructed as to make each three hammers, which form a triangle, strike at once, so as to act toward each other upon the nut being forged, and hammer it without having a tendency to bend the punch $L^2$.

If an octagonal nut is to be made, eight hammers may be used, and the cam which operates them may be made so as to operate four alternate hammers at once, or only two hammers, which are opposite to each other, as may be preferred.

In the above machine, the punch enters the face of the blank which is moved foremost past the shear-edge of the cutter *k*. Hence the punch enters at the rounding or crowning face of the blank, and consequently the under face of the blank, which is in contact with the flatter, is left flat and without either rounded corners or an indented centre.

The nuts made by the invention above described are of a uniform size and thickness, and far superior to those made by hand.

Having thus described the construction and operation of the said machine, so as to enable any person skilled in the art to make and use the invention,

What is claimed as the invention of said PAYE and HALL, is—

1. The combination and arrangement of the cutters, perforating-punch, and edging-hammers, so that the punch enters the nut-blank at the crowning face thereof, and that the nut is hammered edgewise, substantially as before set forth.

2. The combination of the adjustable cutter, transferring instrument, and edging-hammers, in such manner that the nut-blank, after being cut from the bar, is transferred to the place between the edging-hammers so as to be forged edgewise.

3. The combination of the perforating-punch with edging-hammers, arranged and constructed to hammer all sides of the blank without the necessity of turning the blank.

4. The combination of the cutters, the die for the crowning face of the nut-blank, and edging-hammers, substantially as set forth.

5. The combination of the adjustable cutter, the die for the crowning face of the nut, the edging-hammers, and the flatter, substantially as before set forth.

6. The combination of the die and edging-hammers with a flatter, so constructed and arranged relatively to said die and hammers that it operates both as a flatter to compress the nut-blank facewise against the die, and as a transferring instrument to move the blank to the place where the edging-hammers act upon it, substantially as before set forth.

7. The combination of the edging-hammers with cutters, one of which is constructed with a perforation in its face to admit the perforating-punch, and with a lateral opening to permit the escape of the piece punched out of the blank, substantially as before set forth.

8. The combination and arrangement of the punch, edging-hammers, die, and flatter, in such manner that the blank is punched in the space between the edging-hammers before it is forged by them, substantially as before set forth.

9. The combination of the adjustable cutter, punch, die, flatter, and edging-hammers, substantially as before set forth.

10. The combination and arrangement of the flatter and edging-hammers, in such manner that the former operates upon the nut-blank while it is not griped or held by the latter, substantially as before set forth.

In testimony whereof, I have hereto set my hand, this 24th day of September, A. D. 1868.

GEO. DUNHAM.

Witnesses:

GEO. H. COLLINS,
E. S. RENWICK.